United States Patent [19]

Simchock

[11] Patent Number: 5,781,685
[45] Date of Patent: Jul. 14, 1998

[54] VACUUM ASSISTED TEMPORARY STORAGE FIXTURE FOR OPTICAL FIBERS

[75] Inventor: Frederick Simchock, Ewing, N.J.

[73] Assignee: Lucent Technologies Inc., Murray Hill, N.J.

[21] Appl. No.: 733,587

[22] Filed: Oct. 18, 1996

[51] Int. Cl.[6] .................................................. G02B 6/36
[52] U.S. Cl. ...................................... 385/134; 385/147
[58] Field of Search ............................. 385/134, 100, 385/109, 147

[56] References Cited

U.S. PATENT DOCUMENTS 5,016,970  5/1991  Nagase et al. ................ 350/96.21
5,381,497  1/1995  Toland et al. .................... 385/60

Primary Examiner—John Ngo

[57] ABSTRACT

A vacuum assisted temporary storage fixture for an optical fiber includes an elongated compartment open at one end for receipt of the fiber therein and open at the other end for coupling to a source of vacuum.

6 Claims, 3 Drawing Sheets

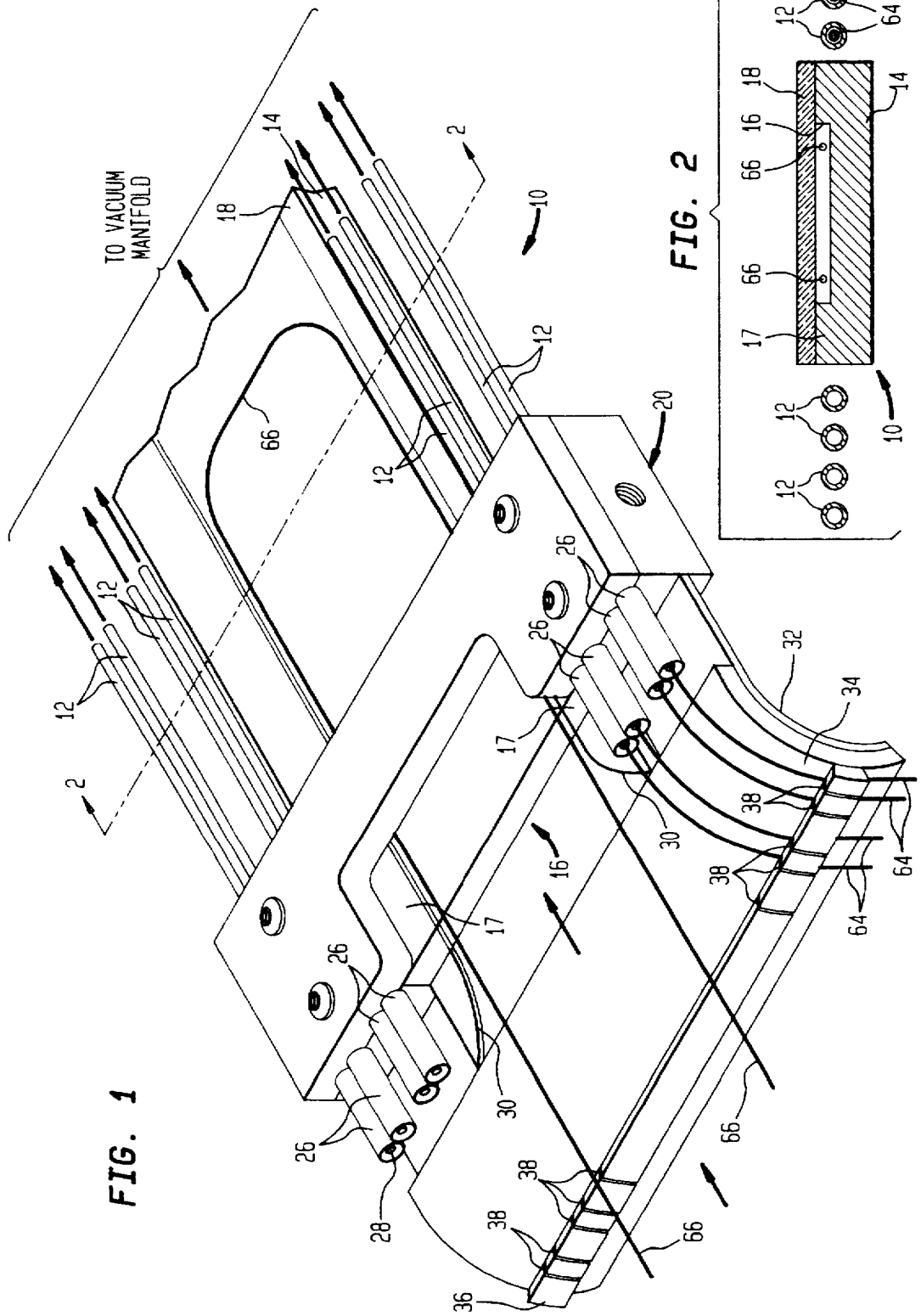

VACUUM ASSISTED TEMPORARY STORAGE FIXTURE FOR OPTICAL FIBERS

BACKGROUND OF THE INVENTION

This invention relates to the processing of optical fibers and, more particularly, to a fixture for effecting the temporary storage of such fibers during their processing.

Undersea repeaters for fiber optic transmission lines are typically manufactured in three major parts a central electronics section and two end caps. Each end of the central electronics section typically has four optical fibers extending outwardly therefrom and each end cap has four optical fibers passing therethrough. During final assembly of the repeater, the four optical fibers passing through each end cap must be spliced to respective ones of the four optical fibers extending outwardly from the central electronics section. This requires that the fiber ends be stripped in an acid bath and then spliced. The fibers are extremely fragile, so in order to provide "spare" fiber in the event of breakage during handling, the pre-spliced fibers can each be about nine feet long. (Some fibers can be shorter as a result of breakage during previous assembly handling.) Therefore, after a pair of fibers are spliced together, there results a fiber up to about eighteen feet long. This resulting fiber is eventually looped and sealed between its respective end cap and the central electronics section. As can well be imagined, handling of these fibers, both before and after splicing, is a delicate operation. Heretofore, this has required that the fibers be precariously routed over work station fixtures having sharp edges and burrs, and into a slotted storage bin below the work station table top. After splicing, two operators were required to wind the spliced fiber loop into its permanent storage container—one operator would wind the fiber into the container while the other would hold the long loop of spliced fibers to prevent the fiber loop from dragging on the floor or the work table fixtures. Accordingly, there exists a need for a fixture which can temporarily store the fibers, both prior to and after splicing, and which reduces the required fiber handling manpower to a single operator.

SUMMARY OF THE INVENTION

In accordance with this invention, there is provided a vacuum assisted temporary storage fixture for an optical fiber. The fixture comprises an elongated container having a first open end and a second open end. The container is adapted for receiving the fiber longitudinally therein from the first open end. The fixture further includes a source of vacuum and means for coupling the vacuum source to the container second open end.

In accordance with an aspect of this invention, the container comprises an elongated tubular member sized so that a single optical fiber can be held therein with sufficient clearance to allow the fiber to be transported longitudinally within the tubular member under the influence of the vacuum source.

In accordance with another aspect of this invention, the storage fixture comprises an elongated container having a first open end and a second open end. The container has a longitudinal axis extending between its first and second ends and has a rectangular interior cross-section orthogonal to the longitudinal axis. The minor axis of the rectangular cross-section is dimensioned so that a single optical fiber can be held in the container interior with sufficient clearance to allow the fiber to move freely within the container interior without interference. The major axis of the crosssection is substantially larger than the minor axis so that a central region of a single fiber can be introduced into the container interior from the first open end in such a manner that the fiber is formed into an elongated U-shape with the closed end of the U-shape being directed toward the container second end. The fixture further includes a source of vacuum and means for coupling the vacuum source to the container second open end. Accordingly, the U-shaped fiber is drawn into the container toward the second open end under the influence of the vacuum source.

BRIEF DESCRIPTION OF THE DRAWINGS

The foregoing will be more readily apparent upon reading the following description in conjunction with the drawings in which like elements in different figures thereof are identified by the same reference numeral and wherein:

FIG. 1 is an isometric view showing the front end of an illustrative fixture constructed in accordance with the principles of this invention;

FIG. 2 is a cross sectional view taken along the line 2—2 of FIG. 1;

DETAILED DESCRIPTION

Figure 3:
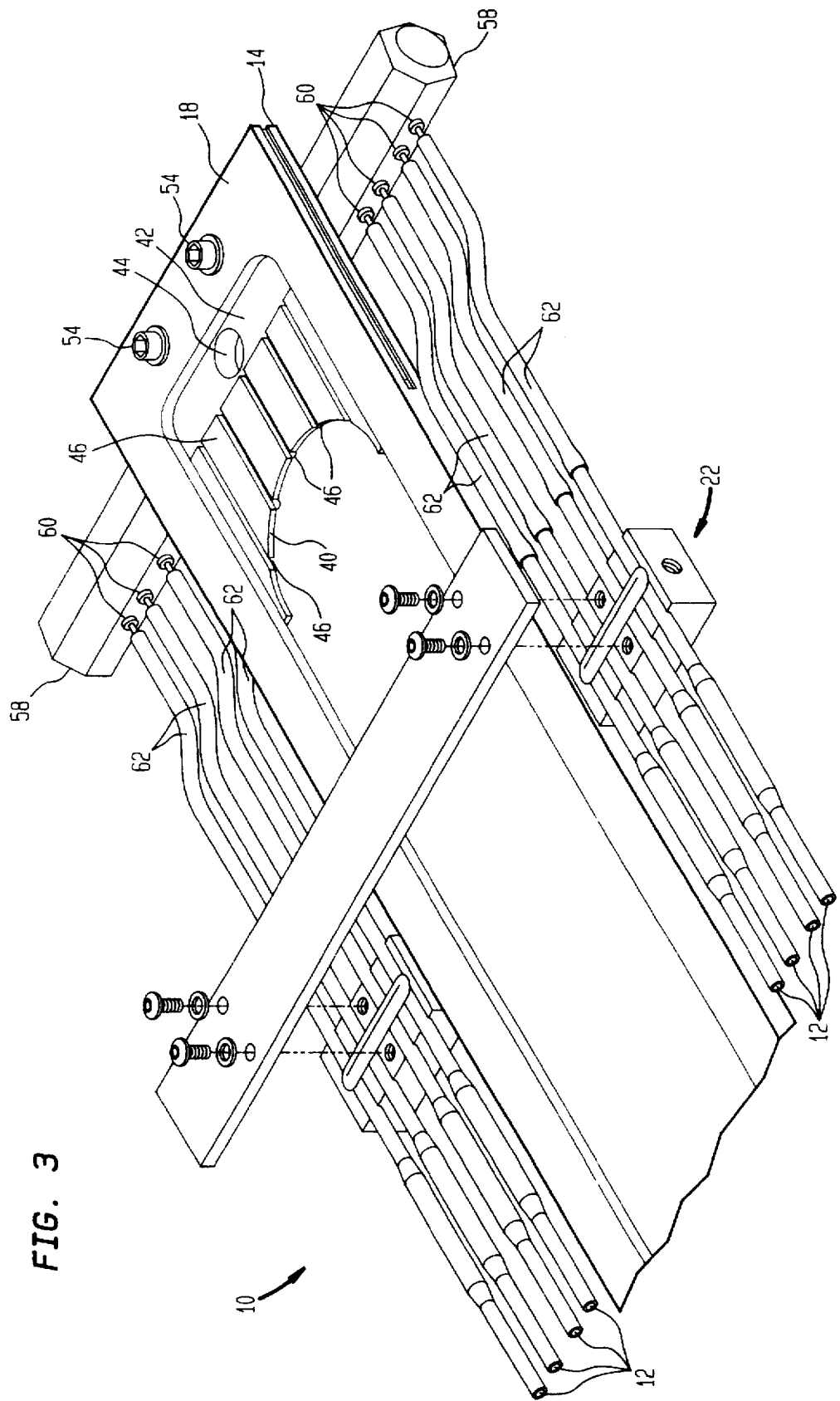
FIG. 3 is an isometric view showing the back end of the illustrative fixture according to this invention.

Referring now to the drawings, FIG. 1 shows the front end of an optical fiber storage fixture constructed according to the present invention and designated generally by the reference numeral 10. As will be described in full detail hereinafter, the fixture 10 includes a plurality of compartments each for storing an individual optical fiber along a substantially straight path and another compartment for storing fibers in a U-shaped configuration, which is particularly useful for storing the extra-long spliced fibers.

The individual fiber storage compartments are each made up of a respective tubular member 12, preferably circular in cross-section and illustratively comprising a length of brass tubing. The interior dimension of each tubular member 12 is such that a fiber can be introduced longitudinally into the tubing member 12 and can be moved longitudinally within the tubing member 12 without interference.

The compartment for holding optical fibers in a U-shaped configuration is formed by providing an elongated plate 14, illustratively formed of aluminum, which has a major surface machined to have a shallow rectangular channel 16 defined by the lateral walls 17 extending along the longitudinal axis of the plate 14. A cover member 18, illustratively of plexiglass, is placed over the walls 17 of the plate 14 to close off the channel 16 and thereby provide the desired compartment. Thus, the compartment provided by the covered channel 16 is rectangular in cross-section orthogonally to the longitudinal axis of the plate 14. This rectangular cross-section has a minor axis (the vertical direction in FIG. 2) which allows a single optical fiber to be held in the channel 16 with sufficient clearance to allow the fiber to move within the channel 16 without interference. The major axis of the rectangular cross-section (the horizontal direction in FIG. 2) is substantially larger than the minor axis to allow a fiber to be formed into a U-shape for longitudinal movement within the compartment 16 without requiring the fiber to be bent sharply.

Figure 4:
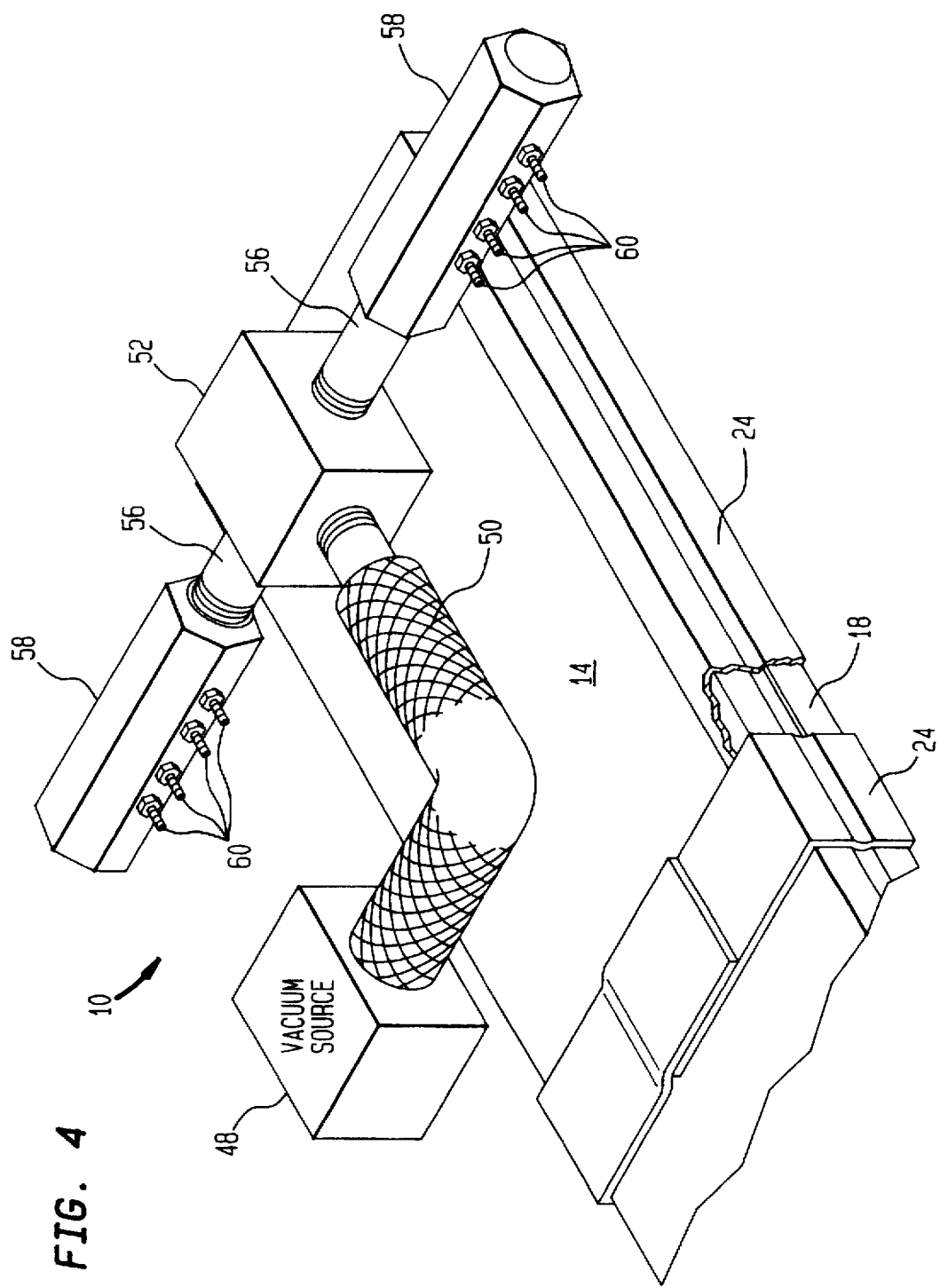
FIG. 4 illustrates the vacuum source for the inventive fixture coupled to the bottom of the back end of the fixture.

Preferably, the overall length of the fixture 10 is approximately seven and one half feet. The tubular members 12, which are slightly shorter than that overall length for reasons which will be apparent after reading the following description, are maintained parallel to each other and to the longitudinal axis of the fixture 10 over their lengths by means of a series of intermediate bracket members (not shown) spaced along the length of the fixture 10 and secured to the plate 14. The tubular members 12 are held at the front end of the fixture 10 by clamping structure 20 and at their other ends by similar clamping structure 22. The clamping structures 20, 22 hold the plate 14, the cover member 18 and the tubular members 12 in aligned, parallel, spaced relation, and also serve to clamp the cover member 18 to the plate 14. The seal between the cover member 18 and the plate 14 should be reasonably air tight. It is preferred to utilize vinyl tape 24 along the edges of the plate 14 and the cover member 18, as shown in FIG. 4. Alternatively, a compliant sealant can be used instead of the vinyl tape 24. In this case, the plate 14 and the cover member 18 would have beveled edges so that a "V" groove results after assembly. Compliant sealant can be used to fill in the "V" groove after the plate 14 and the cover member 18 are clamped together, taking care not to allow sealant to be interposed between the mating surfaces of the plate 14 and the cover member 18.

The tubular members 12 and the channel 16 are open at the front end and the back end of the fixture 10. The openings at the front end are for passage of optical fibers into the respective compartments and the openings at the back end are for connection to a vacuum source, as will be described in full detail hereinafter. At the front end of the fixture 10, as shown in FIG. 1, each of the tubular members 12 is fitted with a plastic entrance guide 26 which has a tapered front opening 28 for aiding in the insertion of an optical fiber into the tubular member 12. Further, at the front end of the fixture 10 the plate 14 extends beyond the cover member 18 and the channel 16 is flared outwardly, as shown at 30 in FIG. 1, again to aid in the insertion of an optical fiber. A curved support plate 32 is secured under the forward end of the plate 14 and is covered with a sheet of foam material 34 of thickness sufficient so that the upper surface of the foam material 34 is at the level of the bottom of the channel 16. Spaced away from the entrance area of the fixture 10, an elongated block of foam material 36 is secured to the foam material sheet 34 and extends across the sheet 34. The block 36 is severed by razor slits 38 which are utilized to hold the optical fibers, as will be described.

As shown in FIG. 3, at the back end of the fixture 10, the channel 16 is terminated by an arcuate wall 40. The plate 14 continues beyond the wall 40 to a region 42 which is again machined to the depth of the channel 16 and is further formed with an opening 44 extending through the plate 14. Between the wall 40 and the region 42, the plate 14 is machined to provide a plurality of longitudinally extending slots 46 to provide communication between the channel 16 and the opening 44 in the region 42 for the introduction of vacuum into the channel 16, as will be described hereinafter.

FIG. 4 illustrates the coupling of the vacuum source 48 to the fixture 10. The vacuum source 48 should provide about 15 inches of vacuum pressure and a conventional household vacuum cleaner may be utilized as the vacuum source 48. The vacuum source 48 is connected via the hose 50 to the manifold block 52. The manifold block is mounted to the underside of the plate 14, illustratively via the bolts 54 (FIG. 3) with an opening in communication with the opening 44 through the plate 14. Thus, the vacuum source 48 is coupled to the channel 16 through the hose 50, the manifold block 52, the opening 44, the region 42 and the slots 46.

Extending laterally from the manifold block 52 are the pair of nipples 56, each of which has connected a respective manifold 58. Each manifold 58 has four hose fittings 60. As shown in FIG. 3, the hose fittings 60 are coupled to the tubular members 12 each by a respective length of flexible tubing 62. Each length of tubing 62 has one end fitted over a respective hose fitting 60 and its other end fitted over the end of a respective tubular member 12. Thus, the vacuum source 48 is coupled to the tubular members 12 via the hose 50, the manifold block 52, the nipples 56, the manifolds 58, the hose fittings 60 and the lengths of tubing 62.

In operation, an operator takes fibers 64 from a repeater to be finally assembled and inserts them each into a respective entrance guide 26. The vacuum generated by the vacuum source 48 pulls the fibers 64 into the tubular members 12, with the operator gently guiding the fibers 64 into the entrance guides 26. When the fibers 64 are in the tubular members as far as desired, the operator pushes each fiber 64 into a respective slit 38 in the foam block 36. Friction between the foam block 36 and the fibers 64 keeps the fibers from moving. After all of the fibers are temporarily stored within respective tubular members 12, each pair of fibers to be spliced together is removed from its tubular member 12 and then processed, resulting in an extra-long spliced fiber 66. To temporarily store the spliced fiber 66, the operator takes a central section of the fiber 66, bends it into a U-shape, and inserts the closed end of the U-shape into the channel 16 at the front end of the fixture 10. Vacuum produced by the vacuum source 48 pulls the fiber 66 into the channel 16, while the operator guides the fiber 66. The fiber 66 is pulled into the channel 16 until the external portion of the fiber 66 remaining outside the entrance to the channel 16 is enough to allow the operator to conveniently grasp and proceed to wind the spliced fiber 66 into its permanent storage fixture.

One pair of fibers at a time is spliced. After splicing a pair, the spliced loop is stored in the channel 16 of the fixture 10 and then wound into a permanent storage container in the repeater. This operation is repeated three more times for the three remaining pairs of fibers, only one loop at a time being stored in the channel 16. If necessary, the operator can place the external portions of the fiber 66 into slits 38 of the foam block 36. The operator now winds the spliced fiber loop 66 into a permanent storage fixture, while withdrawing it from the channel 16 of the fixture 10. Thus, the fixture 10 provides storage and support for the long fiber loop 66 during this operation, a function which previously required a second operator to support and guide the loop.

Accordingly, there has been disclosed an improved fixture for effecting the temporary storage of optical fibers. While a preferred embodiment of this invention has been disclosed herein, it is understood that various modifications and adaptations to the disclosed embodiment are possible, and it is intended that this invention be limited only by the scope of the appended claims.

What is claimed is:

1. A storage fixture for an optical fiber, comprising:
   an elongated container having a first open end and a second open end and adapted for receiving said fiber longitudinally therein from said first open end;
   a source of vacuum; and
   means for coupling said vacuum source to said container second open end;
   wherein said container comprises an elongated tubular member sized so that a single optical fiber can be held therein with sufficient clearance to allow said fiber to be transported longitudinally within said tubular member under the influence of said vacuum source.

2. A storage fixture for an optical fiber comprising:

an elongated container having a first open end and a second open end, said container having a longitudinal axis extending between said first and second ends and having a rectangular interior cross-section orthogonal to said longitudinal axis where the minor axis of the interior cross-section is dimensioned so that a single optical fiber can be held in the container interior with sufficient clearance to allow said fiber to move freely within the container interior without interference, the major axis of said cross-section being substantially larger than the minor axis so that a central region of a single fiber can be introduced into the container interior from the first open end in such a manner that the fiber is formed into an elongated U-shape with the closed end of the U-shape being directed toward the container second end;

a source of vacuum; and means for coupling said vacuum source to said container second open end;

whereby the U-shaped fiber is drawn into the container toward the second open end under the influence of the vacuum source.

3. The storage fixture according to claim 2 wherein said elongated container includes:

an elongated plate formed with a recessed channel in a major surface of said plate, said channel being defined by a pair of lateral walls extending along the longitudinal axis of the plate and being open to a first end of said plate, said plate further including a recessed region adjacent its other end and an opening extending through said plate into said recessed region, and said plate further including at least one recessed longitudinal slot in said major surface extending between said channel and said recessed region; and a cover member secured to the major surface of said plate to provide a cover for said channel, said recessed region and said at least one slot; and wherein said means for coupling is connected to said opening in said recessed region.

4. The storage fixture according to claim 3 wherein the end of said channel adjacent said at least one slot is formed as an arcuate wall.

5. The storage fixture according to claim 3 wherein the end of said channel adjacent said first end of said plate is formed to flare outwardly.

6. The storage fixture according to claim 2 further comprising:

a least one tubular member extending parallel to the longitudinal axis of said container, said at least one tubular member having first and second open ends and being sized so that a single optical fiber can be introduced into said at least one tubular member from its first open end with sufficient clearance to allow longitudinal movement of said fiber within said tubular member without interference; and means for coupling said vacuum source to said at least one tubular member second open end.

* * * * *